Oct. 23, 1928.                                            1,688,803
J. T. DAILEY ET AL
TRAFFIC SIGNAL FOR MOTOR VEHICLES
Filed March 30, 1927            2 Sheets-Sheet 1
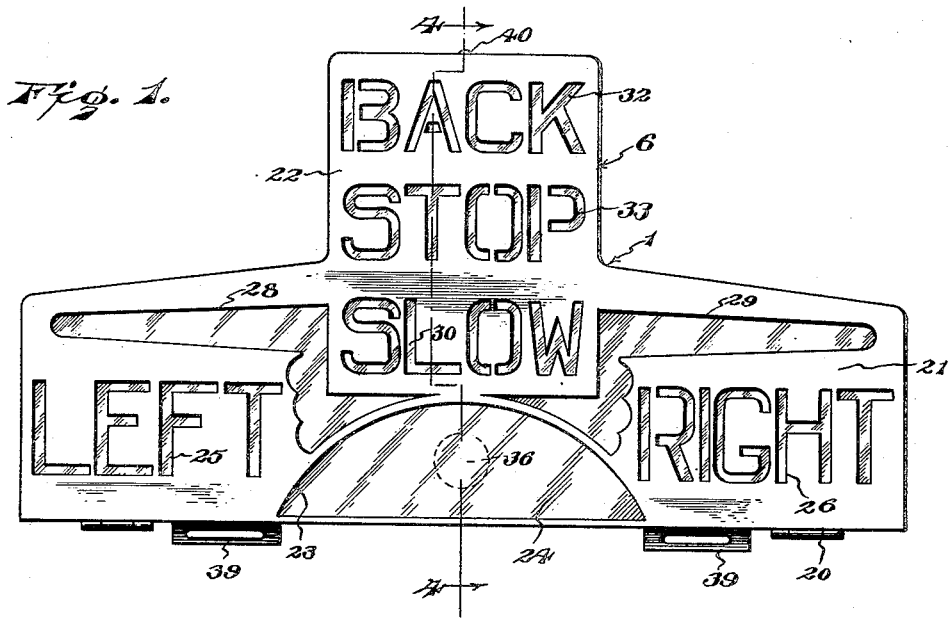
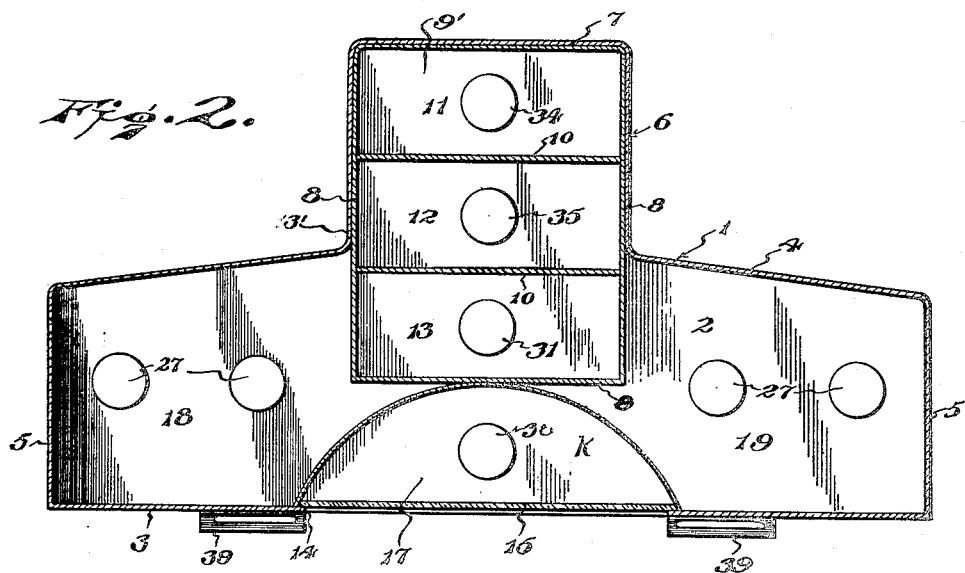
Inventor
J. T. Dailey
J. J. Jackson
By Lacey & Lacey, Attorneys Oct. 23, 1928.  
J. T. DAILEY ET AL  
1,688,803  
TRAFFIC SIGNAL FOR MOTOR VEHICLES  
Filed March 30, 1927   2 Sheets-Sheet 2
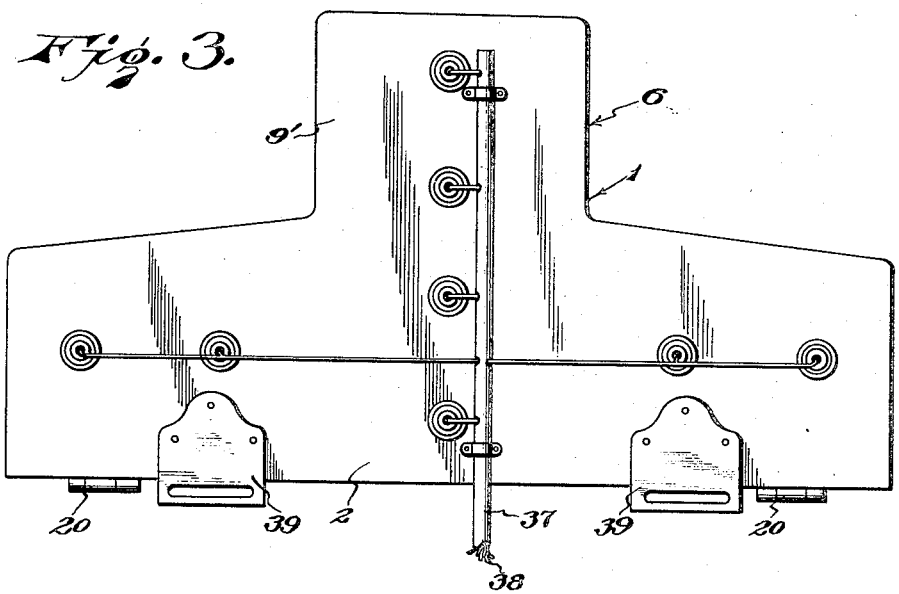
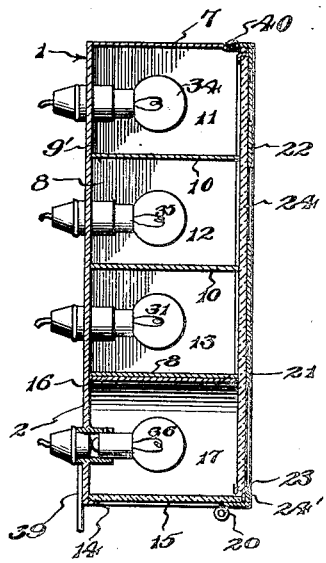
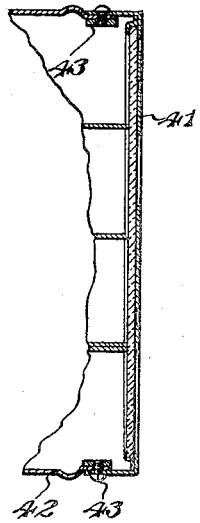
Inventor  
J. T. Dailey  
J. J. Jackson  
By Lacey & Lacey, Attorneys Patented Oct. 23, 1928.

1,688,803

UNITED STATES PATENT OFFICE.

JAMES THOMAS DAILEY AND JESSE JAMES JACKSON, OF KINGWOOD, WEST VIRGINIA.

TRAFFIC SIGNAL FOR MOTOR VEHICLES.

Application filed March 30, 1927. Serial No. 179,621.

The present invention is directed to improvements in traffic signals for motor vehicles.

The primary object of the invention is to provide a device of this character constructed to be mounted upon the rear of a vehicle in order to indicate to the drivers of following vehicles the intended movement of the driver of the vehicle equipped with the device.

Another object of the invention is to provide a signal of this nature so constructed that access can be conveniently had to the interior thereof for adjustment and replacement of bulbs therein.

Another object of the invention is to provide a signal of this kind which is extremely simple in construction, efficient in operation, and one which can be manufactured at a very small cost.

In the accompanying drawing:

Figure 1 is a rear view of the signal.

Figure 2 is a longitudinal, sectional view therethrough.

Figure 3 is a front view of the signal.

Figure 4 is a sectional view on line 4—4 of Figure 1.

Figure 5 is a detail vertical sectional view of a slightly modified form of the invention.

Referring to the drawing, 1 designates a main casing formed of suitable gage sheet metal and includes a front wall 2, bottom wall 3, top wall 4 and end walls 5, the top wall having associated therewith, a centrally disposed supplemental casing 6, the lower end of which extends into the main casing 1, as more clearly illustrated in Figure 2 of the drawing. The supplemental casing comprises a top wall 7, side walls 8, a bottom wall 8, and a front wall 9', there being a pair of vertically spaced horizontally disposed partitions 10—10 mounted therein and dividing the supplemental casings into lamp compartments 11, 12 and 13.

It will be observed upon reference to Figure 2 that the casing 1 is provided with a dome 13' and in which the supplemental casing is engaged, the inherent resiliency of the dome 13' serving to maintain the supplemental casing in place, or if desired the casing may be maintained in the dome by spot welding or may be secured therein in any other suitable manner.

The bottom wall 3 of the casing 1 is provided with an opening 14 which is closed by a clear lens 15, said opening being spanned by an arch plate 16, which forms in conjunction with the lens 15 a tail lamp compartment 17. It will be observed that the plate 16 is intimately engaged at its highest point with the bottom 8 of the casing 6, said plate not only serving to hold the supplemental casing in place but also serves to divide the casing 1 into lamp compartments 18 and 19.

To the rear edge of the bottom wall 3 of the main casing is hingedly connected, as at 20, the lower edge of the cover 21, said cover having an extension 22 to close the rear side of the compartments 11 and 12 of the supplemental casing and the open side of the dome 13', said cover also serving to close the compartments 18 and 19, as well as the compartment 13. The cover 21 is formed with an opening 23 which is closed by the red colored glass pane 24, said pane being so shaped as to also intimately engage the inner face of the cover 21 and extension 22, and is retained in place by a frame 24, or in any other suitable manner.

The cover 21 is provided with slots 25 and 26, so formed as to denote such indicia as Left and Right, which coincide, respectively, with the compartments 18 and 19 in order that when the bulbs 27 located in the respective compartments are illuminated the indicia will be displayed. The cover 21 is further slotted, as at 28 and 29, the slots representing hands having fingers pointing to the right and left. These simulations are illuminated when the bulbs in the compartments 18 and 19 are illuminated and will forcibly indicate the direction of travel of the vehicle.

Slots 30 are formed in the cover 21 between the slots 28 and 29 and depict the indicia Slow, said slots coinciding with the compartment 13 so that when the bulb 31 in said compartment is illuminated the indicia will be prominently displayed.

The extension 22 is slotted as at 32 and 33, to display the indicia Back and Stop, which coincides, respectively, with the lamp compartments 11 and 12 of the supplemental casing 6, the illumination of these indicia being obtained when the respective bulbs 34 and 35 are illuminated. It will be of course understood that the glass pane 24 is common to the various indicia and since the pane is colored red, the respective indicia will be prominently displayed upon selectively illuminating the bulbs in the respective compartments. Since the pane 24 closes the opening 23 the bulb 36 therein can be illuminated in order to produce a tail light for the vehicle.

Secured to the back walls 2 and 9' of the respective casings 1 and 6 is a tube 37 in which the circuit wires 38 are located and lead to the various bulbs for selectively illuminating the same. These wires lead from a suitable switch mechanism, not shown, which can be located for convenient operation by the driver, current being furnished to the wires from the automobile battery.

To the rear wall 2 of the casing 1 are secured plates 39 which serve to suspend the usual license tag, the same being illuminated by the rays of light transmitted through the lens 15 from the lamp compartment 17.

The cover 21 is retained in its closed position by a screw 40, or if desired, any other suitable securing devices may be used.

In Figure 5 of the drawings, the cover 41 instead of being hingedly connected to the casing 42 is secured thereon by screws 43.

It will be of course understood that a similar signal can be mounted upon the front of a motor vehicle, thereby illuminating the front license plate. A signal thus mounted will indicate to pedestrians and approaching motorists the course intended to be taken. The front signal casing will be in circuit with the rear signal casing and will display corresponding indicia simultaneously. An indicator of any suitable construction may be placed in the circuit in order that the driver will be warned if the signals are not being illuminated properly.

From the foregoing description it will be seen that a signal has been provided which is constructed in such manner that the respective compartments can be selectively illuminated to display indicia which will indicate to a driver of a car following, the direction and movement intended to be maneuvered by the car equipped with the device.

Having thus described the invention, we claim:

A signal of the class described, comprising a main casing, a dome forming a part of the top wall of the casing, the bottom of the casing having an opening therein closed by a lens, an arched plate spanning the opening and defining a tail light compartment, a supplemental casing having its upper portion engaged in the dome and its lower portion extended into the main casing and resting upon said plate, the supplemental casing cooperating with the main casing to provide lamp compartments, the main and supplemental casings each having an open end, a single cover connected to the main casing and closing the open end of each casing, said cover having openings therein shaped to designate direction indicia for registration with the respective compartments.

In testimony whereof we affix our signatures.

JAMES THOMAS DAILEY. [L. S.]
JESSE JAMES JACKSON. [L. S.]